Figure 1:
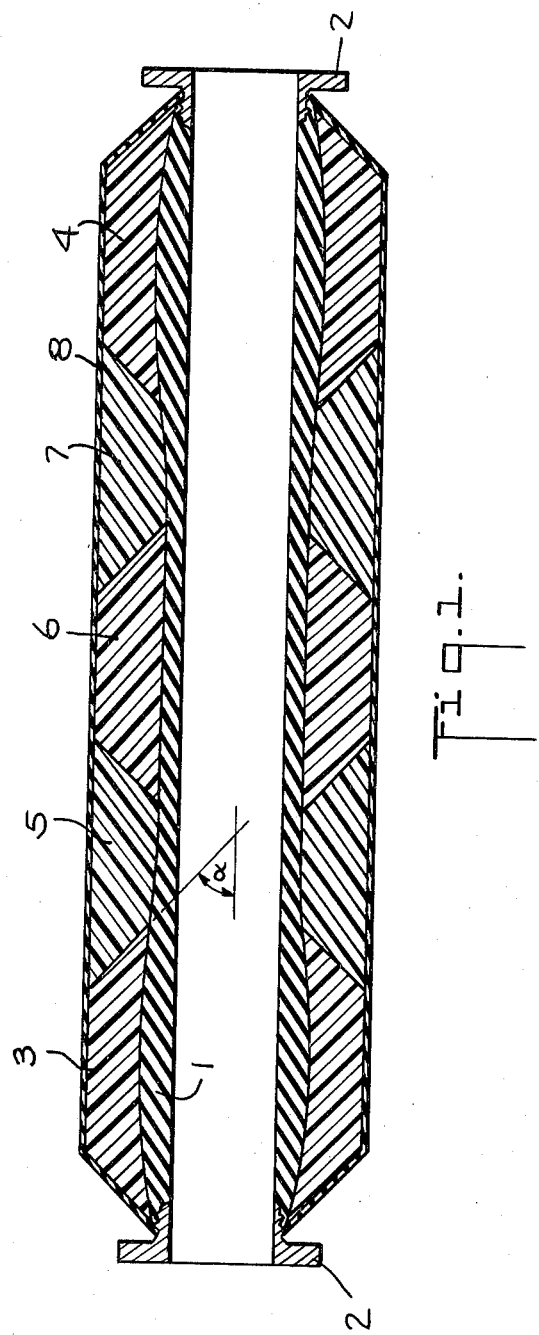

United States Patent [19]
Thawley

[11] 3,902,531
[45] Sept. 2, 1975

[54] BUOYANT HOSE
[75] Inventor: Clive S. Thawley, Colinton, Edinburgh, Scotland
[73] Assignee: Uniroyal Limited, Midlothian, Scotland
[22] Filed: Oct. 18, 1973
[21] Appl. No.: 407,742

[30] Foreign Application Priority Data
Oct. 23, 1972 United Kingdom............... 48640/72

[52] U.S. Cl..................... 138/137; 9/8 R; 138/103; 138/177
[51] Int. Cl.[2].......................................... F16L 11/12
[58] Field of Search ........ 9/8 R; 138/103, 106, 110, 138/118, 120, 137, 138, 139, 177, 178

[56] References Cited
UNITED STATES PATENTS

| | | | |
|---|---|---|---|
| 2,394,270 | 2/1946 | Swain.............................. | 138/137 X |
| 3,119,415 | 1/1964 | Galloway et al................... | 138/103 |
| 3,665,967 | 5/1972 | Kachnik............................. | 138/137 |
| 3,773,090 | 11/1973 | Ghersa et al.................... | 138/178 X |
| 3,811,477 | 5/1974 | Thawley............................. | 138/103 |

*Primary Examiner*—John W. Huckert
*Assistant Examiner*—Charles Gorenstein
*Attorney, Agent, or Firm*—Charles A. Blank, Esq.

[57] ABSTRACT

A buoyant hose in which a hose body is surrounded by buoyancy material and has coupling means at each end of the hose body and has a water-impermeable covering over the buoyancy material. The buoyancy material in the regions of the ends of the hose has a greater compression modulus and less flexibility than the buoyancy material around the central region of the hose.

9 Claims, 1 Drawing Figure

BUOYANT HOSE

This invention relates to hose and particularly to oil suction and discharge hose used in conveying oil across a body of water, for example, between a tanker and a shore installation.

It is well known that hose of this nature is required to be buoyant when full of water, and there have in the past been various proposals for imparting the required buoyancy to the hose. One of the difficulties that has been experienced is in providing buoyancy in such a way that the flexibility of the hose is not impaired to any great extent, yet possible crushing of the buoyancy material, particularly in the end regions of hose fitted with heavy couplings, such as nipples and flanges, is reduced.

It is an object of the present invention, therefore, to provide a new and improved buoyant hose which avoids one or more of the above-mentioned disadvantages of prior such hose.

It is another object of the invention to provide a new and improved buoyant hose which is flexible and which is subject to reduced possibility of crushing.

In accordance with the present invention, a hose which is buoyant when full of water comprises a hose body comprising elastomeric material, coupling means at each end of the hose body, buoyancy material surrounding the hose body, and a water-impermeable covering over the buoyancy material, the buoyancy material in the regions of the ends of the hose having a greater compression modulus and less flexibility than the buoyancy material around the central region of the hose.

The material of greater compression modulus has greater resistance to crushing than the other buoyancy material, but is not as flexible. Lack of flexibility is, however, not disadvantageous, as this material is confined to the end sections of the hose which are in any case relatively inflexible compared with the remainder of the hose and in use are subject to little bending compared with the remainder of the hose. The greater crush-resistance is advantageous on two counts. In single buoy mooring systems the end of the hose line usually carries apparatus for connection to the tanker and is supported by a buoy. Should the buoy be damaged by storm or impact the end of the line will sink, dragging part of the hose below the surface. The hydrostatic pressure of the sunken parts of the hose tends to compress the buoyancy material, and the use at the hose ends of compression-resistant material which will resist the hydrostatic pressure and retain buoyancy is thus advantageous.

Greater crush-resistance is also useful in storage of the hose, which is often done by stacking a number of hoses one on top of another with the nipples and flanges of one hose resting on those of one or two hoses below. As the presence of the nipples and flanges concentrate more weight at the ends of the hose, it is advantageous to use buoyancy material of greater load-bearing capacity in these end regions.

Flexibility is required along the central parts of the hose so that the hose may bend under the influence of water movement, and the use of the more flexible buoyancy material with lower compression modulus in this region of the hose does not render the hose undesirably rigid.

Preferably the buoyancy material is applied to the hose as a number of contiguous hoops along the body of the hose, the hoops being adhered together, to the hose body and to the water-impermeable covering. Preferably each hoop has a cross-section such that the interface between adjacent hoops extends at an acute angle to the hose axis. The angle is preferably from 20° to 60°, with about 45° being particularly preferred. The cross-section may thus be a parallelogram, when all interfaces will extend in the same direction or trapezoidal, when alternate interfaces along the length of the hose extend in one direction and the intervening interfaces extend in the opposite direction with respect to the length of the hose. The joint between the circumferential ends of any one hoop preferably lies in a plane which is radial of the hose.

These directions for the interfaces and joints of hoops of trapezoidal cross section reduce the possibility of separation of the joined parts on flexure of the hose. However, for ease of assembly on the hose, hoops with parallelogram cross sections are preferred.

The preferred buoyancy material is an expanded plastic material, and particularly suitable is expanded cross-linked polyethylene. In the end regions of the hose the polyethylene preferably has a density of from 3 to 8 lbs./cu. ft., while in the central region of the hose the density is preferably from 2 to 4 lbs./cu. ft., these ranges being given with the requirement that the density in the central region must always be less than that in the end regions to obtain the desired relationship of compression modulus and flexibility.

Difficulty may be experienced in bonding the polyethylene to itself, to the hose body and to the water-impermeable cover, and satisfactory adhesion has been obtained using a neoprene-based adhesive. However, other adhesives could be used, and different adhesives can of course be used in different regions of the hose. When expanded polyethylene is used, it is not possible to use conventional techniques to vulcanise the covering material and adhesive as there will be a danger of the polyethylene collapsing, particularly in the low compression modulus central region. Curing is, therefore, desirably carried out using low pressure steam, for example at about 2 pounds per square inch gauge, when, for conventional thicknesses of material, a cure time of about 6 hours is suitable. Obviously the steam pressure and cure time can be varied from these figures.

Figure 2:
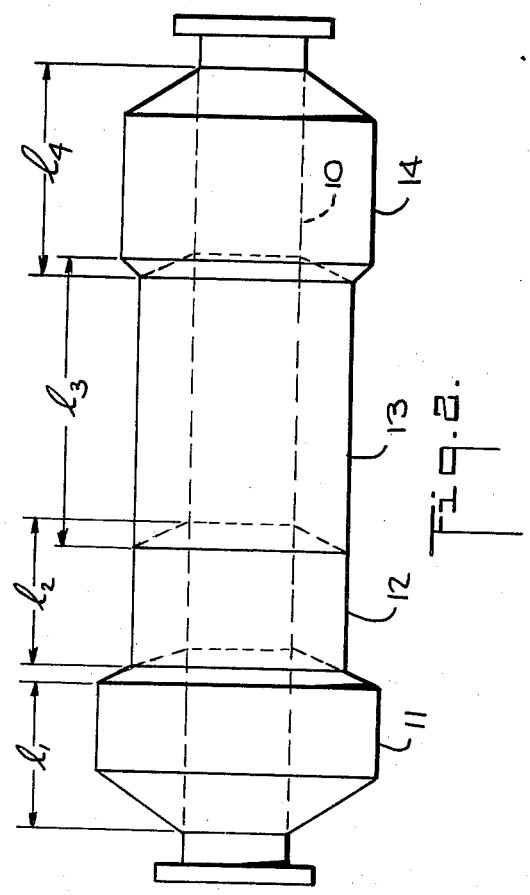

Referring now more particularly to the drawings:

FIG. 1 is a schematic longitudinal cross-sectional view through a hose constructed in accordance with the invention; and FIG. 2 is a schematic longitudinal side view of a hose constructed in accordance with another form of the invention.

For a better understanding of the present invention, together with other and further objects thereof, reference is made to the following description, taken in connection with the accompanying drawings and its scope will be pointed out in the appended claims.

As shown in FIG. 1 of the drawings, the hose comprises a hose body 1 which may be of any conventional construction and typically include an oil-resistant inner liner covered by layers of elastomeric material in which may be incorporated one or more fabric breaker-layers and one or more textile or metallic reinforcing layers, such as layers of helically wound textile fiber or wire.

The hose body is fitted at each end with conventional nipples and flanges 2. The hose body, with nipples and flanges attached, is vulcanized before application of the buoyancy material, and the details of the hose body structure are not material to the present invention.

The hose body is circumferentially surrounded by hoops of buoyancy material. The two hoops 3 and 4 at the ends of the hose preferably are of expanded cross-linked polyethylene having a density of for example, 4 lbs./cu. ft. The three hoops 5, 6 and 7 in the center of the hose preferably are of expanded cross-linked polyethylene having a density of, for example 2.5 lbs./cu. ft. Each hoop may be of trapezoidal cross-section, with the interface between adjacent hoops making an acute angle α, usually about 45°, to the longitudinal axis of the hose, and with axially alternate interfaces extending in one direction and the intervening interfaces extending in the opposite direction with respect to the length of the hose. The free ends of the band material that makes up each hoop preferably are cut and joined along a joint that lies in a plane extending radially of the hose. These free ends are preferably bonded together by a neoprene-based adhesive, which adhesive preferably is also used between the radially inner surface of each hoop and the radially outer surface of the hose body, and along the interfaces between the adjacent hoops.

Circumferentially surrounding the buoyancy layer is a water-impermeable cover 8, which preferably is also bonded to the hoops 3 to 7 by a neoprene-based adhesive.

After application of the hoops and the cover 8 to the hose body the hose is subjected to a further curing treatment to cure the cover 8 and the adhesive layers, such cure being effected, for example, in steam at a pressure of 2 pounds per square inch gauge for a period of six hours. The hose is then finished and is ready for use.

The invention is applicable whatever may be the elastomeric material forming the radially outermost layer of the hose body, and whatever may be the composition of the cover layer 8. The adhesives must, of course, be compatible with the different materials that they are to bond. A neoprene-based adhesive has been found suitable for bonding, for example, expanded polyethylene to itself, to a styrene-butadiene rubber outer layer of the hose body and to a cover formed of fabric skim-coated with neoprene or styrene-butadiene rubber.

The cover 8 may be formed in many different ways. For example, it may comprise two plies of nylon skim-coated with neoprene and covered by a layer of neoprene, or two plies of nylon skim-coated with styrene-butadiene rubber and covered by a layer of a blend of polyvinylchloride and butadiene-acrylonitrile copolymer, or any one of a number of other combinations. The cover may alternatively by polyurethane, which could be sprayed on in liquid form. Preferably a hose, covered with buoyancy material is mounted in a lathe and rotated slowly at, for example, ten revolutions per minute. The polyurethane is dispersed from the mixing head of a mixing machine which is traversed along the hose. The polyurethane may be spread with a flexible rubber blade to give a smooth finish. The polyurethane undergoes a cold cure, thereby not subjecting the hose to a further heat cycle. The buoyancy material can, therefore, be non-cross-linked which costs less than cross-linked polyethylene. If a heat cycle is required to cure the outer polyethylene cover, non-cross-linked materials are unsatisfactory as they collapse under the curing conditions.

The buoyancy layer may be formed of material other than polyethylene, and the material in the end regions could be different from that in the central region. The hoops need not be trapezoidal in cross-section, but could be of parallelogram form or even square or rectangular. In the case of a square or rectangular cross section, however, the bond at the interface may not be strong enough to withstand flexure through large angles. The buoyancy material need not be applied in hoop form, but all or part of the buoyancy material could be spirally wound on to the cured hose body.

Referring now more particularly to FIG. 2 of the drawings, a hose body 10 is represented in broken line construction and for example, four hoops 11, 12, 13, 14 of buoyancy material are represented thereon. The end hoop 11 has a cross-section of trapezoidal shape, the hoops 12 and 13 have parallelogram cross sections and the end hoop 14 has a cross section approximating the shape of a parallelogram. The interface between adjacent hoops makes an acute angle, for example, 45°, to the longitudinal axis of the hose.

Hose lengths may, for example, be, 25, 30, 35 and 40 feet and hose bore diameters may, for example, be in the range of 8 inches to 30 inches. The end hoops 11 and 14 may have lengths $l_1$ and $l_4$ each, for example, 51 inches and hoops 12 and 13 may have lengths $l_2$ and $l_3$, of, for example, 5 feet and 10 feet respectively. The height of the cross sections of buoyancy material of hoops 11, 12, 13 and 14 may, for example, be in the range of 90 millimeters to 210 millimeters.

While there have been described what are at present considered to be the preferred embodiments of the invention, it will be obvious to those skilled in the art that various changes and modifications may be made therein without departing from the invention, and it is, therefore, aimed to cover all such changes and modifications as fall within the true spirit and scope of the invention.

I claim:

1. A hose which is buoyant when full of water comprising a hose body comprising elastomeric material coupling means at each end of said hose body, buoyancy material surrounding said hose body, and a water-impermeable covering over said buoyancy material, the buoyancy material in the regions of the ends of the hose having a greater compression modulus and less flexibility than the buoyancy material around the central region of the hose.

2. A hose in accordance with claim 1 in which said buoyancy material is an expanded plastic material.

3. A hose in accordance with claim 1 in which said buoyancy material is expanded cross-linked polyethylene.

4. A hose in accordance with claim 1 in which the buoyancy material in said regions of said ends of the hose has a density in the range of three to eight pounds per cubic foot.

5. A hose in accordance with claim 1 in which said buoyancy material around said central region of the hose has a density in the range of two or four pounds per cubic foot.

6. A hose in accordance with claim 1 in which said buoyancy material in said regions of said ends of the hose has a density in the range of three to eight pounds per cubic foot and in which said buoyancy material around said central region of the hose has a density in the range of two to four pounds per cubic foot.

7. A hose in accordance with claim 1 in which said buoyancy material surrounds said hose body in hoops.

8. A hose in accordance with claim 7 in which each hoop is of trapezoidal cross section and adjacent hoops have an interface therebetween at an acute angle with respect to the longitudinal axis of the hose.

9. A hose in accordance with claim 7 in which some of said hoops have parallelogram cross sections and adjacent hoops have an interface at an acute angle with respect to the longitudinal axis of the hose.

* * * * *